United States Patent
Quenot

[11] 3,806,059
[45] Apr. 23, 1974

[54] TAPE MEASURE
[75] Inventor: Michel Quenot, Besancon, France
[73] Assignee: Stanley Mabo, Besancon, France
[22] Filed: Jan. 11, 1972
[21] Appl. No.: 216,965

[30] Foreign Application Priority Data
Jan. 14, 1971 France .............................. 71.01871
Feb. 4, 1971 France .............................. 71.04534

[52] U.S. Cl. .............................. 242/84.8, 242/96
[51] Int. Cl. ...................... B65h 75/16, B65h 75/40
[58] Field of Search ......... 242/84.8, 96, 99; 33/138

[56] References Cited
UNITED STATES PATENTS

| 3,001,738 | 9/1961 | Quenot | 242/84.8 |
| 2,973,918 | 3/1961 | Hancock | 242/99 |
| 3,044,731 | 7/1962 | Zelnick | 242/84.8 |
| 3,053,470 | 9/1962 | Quenot | 242/84.8 |
| 1,514,901 | 11/1924 | Gilman | 242/84.8 |

FOREIGN PATENTS OR APPLICATIONS

| 936,536 | 12/1955 | Germany | 242/84.8 |
| 1,190,894 | 5/1970 | Great Britain | 242/84.8 |

Primary Examiner—John W. Huckert
Assistant Examiner—Edward J. McCarthy
Attorney, Agent, or Firm—Robert E. Burns; Emmanuel J. Lobato

[57] ABSTRACT

The tape drum of a tape measure is rotatably mounted between two elongated side plates and can be driven by a crank pivotally mounted on a support member freely rotatably mounted coaxial with the drum. The crank is foldable between a rest position and a drum winding position in which a coupling element on the crank engages with a cooperating eccentric coupling element in the drum.

13 Claims, 7 Drawing Figures

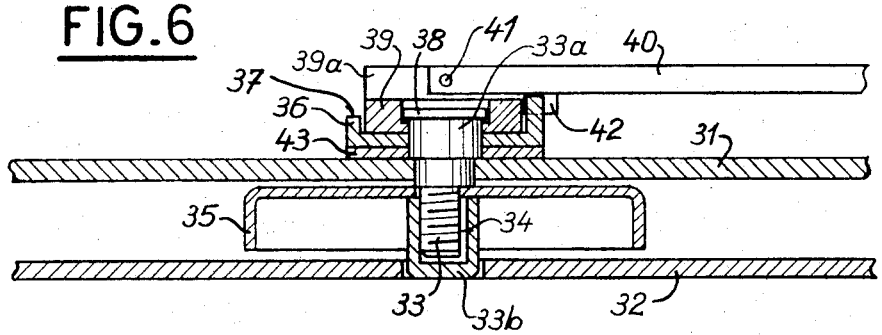
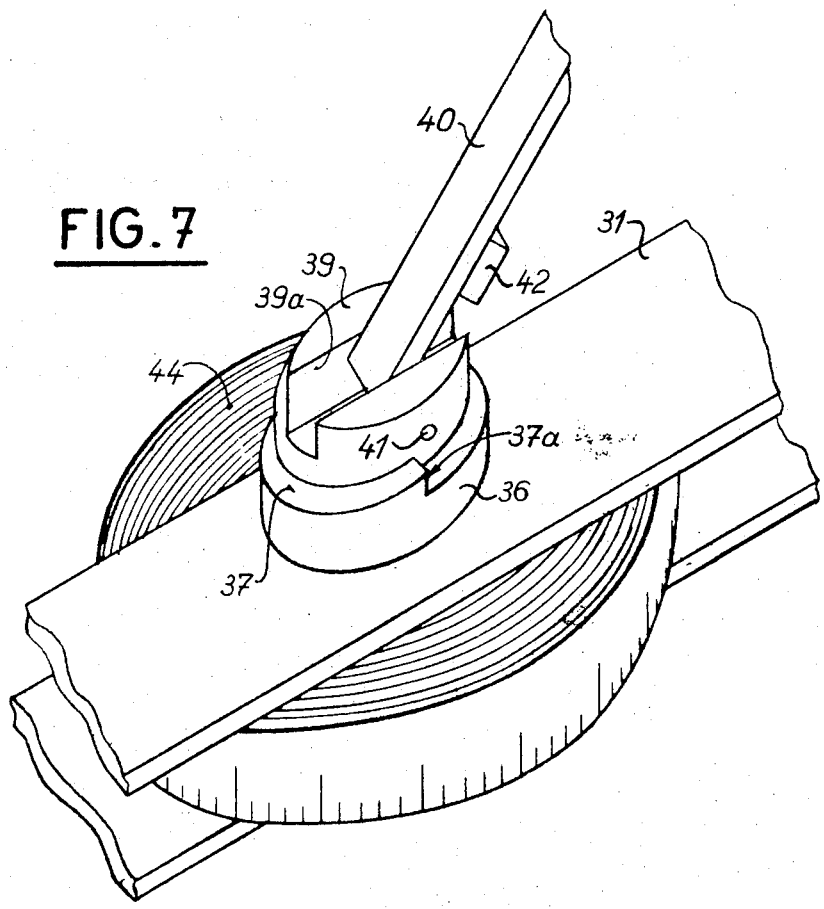

TAPE MEASURE

This invention relates to tape measures of the type comprising a tape drum rotatably mounted between a pair of side plates.

It is already known to provide such instruments with a driving mechanism comprising a winding crank pivotally mounted about an axis eccentric to the axis of the drum, this crank comprising an elongated slot which, when the crank is folded in a winding position, fits over a corresponding protruding portion of the end of the shaft of the drum. Such driving mechanisms, in which the coupling of the crank and the drum is provided on the drum shaft, require relatively complex and carefully machined parts, to ensure accurate and reliable engagement of the cooperating coupling parts on the crank and the drum shaft, and the manufacturing cost is consequently high.

It is therefore an aim of the invention to provide a tape measure of the aforementioned type with a driving mechanism which can be of simple and robust construction, and which does not require particularly precise manufacturing tolerances in the dimensions of the component parts, whereby the instrument may be manufactured at a competitive cost price.

Another aim of the invention is to avoid that the rotational couple or torque applied by the winding crank has a component which is transferred to the shaft of the tape drum.

According to the invention, a tape measure comprises two side plates between which a tape drum is rotatably mounted, a winding crank pivotally carried by a support member coaxially rotatably mounted with the drum, an eccentric first coupling element integral with the drum, and a second coupling element on the winding crank, said winding crank being foldable between a rest position in which the first and second coupling elements are disengaged and a drum winding position in which the first and second coupling elements are engageable.

Embodiments of the invention will now be described, by way of example, with reference to the accompanying drawings, in which:

FIG. 6 is a cross-section through the winding mechanism of a further embodiment of tape measure, with the tape removed; and FIG. 7 is a perspective view of this further embodiment, including the tape.

Figure 1:
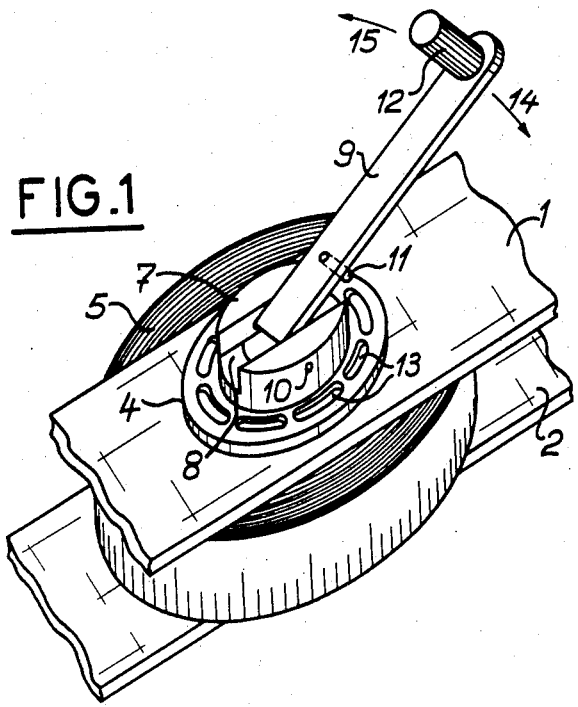
FIG. 1 is a partial perspective view of a first embodiment.
Figure 2:
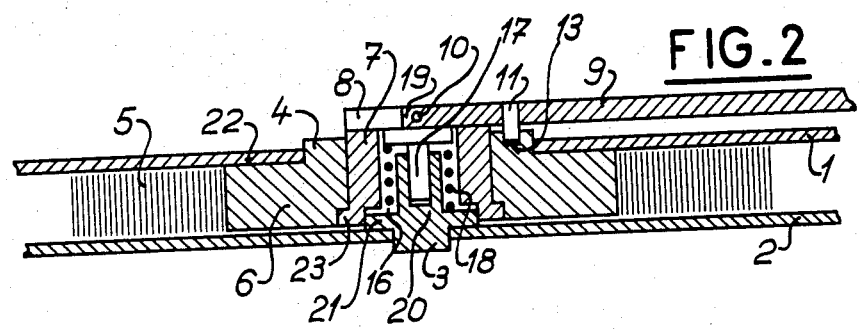
FIG. 2 is a cross-section through FIG. 1, with the winding crank in the drum winding position.

Referring to FIGS. 1 and 2, the linear measuring instrument shown comprises two spaced-apart elongated side or support plates 1 and 2 with a haft or gripping handle (not shown) at one of their ends, and held apart at their other ends by a spacing member, also not shown. Each of the side plates has a circular orifice in which circular shoulders 3 and 4 of a tape drum driving mechanism are freely rotatably mounted. This mechanism comprises a drum 6 upon which a tape 5 is wound and which includes the shoulder 4; a hollow hub 7 freely mounted in a central opening in the drum 6; and a friction member 20 located in a bore 16 of the hub 7. This member 20, which includes the shoulder 3, is axially slidably mounted in the bore 16 and is outwardly urged by means of a compression spring 18.

The hub 7 protrudes from the outer side of the side plate 1 and from the annular shoulder 4 which protrudes laterally from the drum 6, and is transversally slotted to form a clevis 8 in which a crank member 9 is pivotally mounted by means mounting same including a pin 10 transversal to the axis of the drum/hub assembly.

The crank 9 comprises a knurled gripping handle 12 protruding from one face at an outer end thereof, and said coupling means comprising a pin 11 projecting from the opposite face. The pin 11 is located along the crank 9 so as to be able to come into engagement with any one of a plurality of apertures 13 disposed in the annular shoulder 4 around a circle concentric to the axis of the drum/hub assembly. The number of apertures 13 may vary, and they preferably have a curved arcuate oblong shape.

The crank 9 can be pivoted to a driving or winding position, as indicated by the arrow 14 in FIG. 1 and as shown in FIG. 2, in which position the pin 11 fits into one of the apertures 13. Obviously, in this position, rotation of the crank 9 in either direction drives the drum 6. The crank 9 can also be pivoted to a retracted, non-winding or rest position, as indicated by the arrow 15 in FIG. 1, in which the pin 11 is fully disengaged from the drum 6 which can freely rotate independantly of the crank 9, for example when the free end of the tape 5 is pulled.

In order to stabilize the driving and rest positions of the crank 9, the head of a part 17, comprising a shank freely axially mounted in a central bore in the member 20, is outwardly urged in the bore 16 of hub 7 by means of the spring 18 and bears against the lower face of an end part 19 of the crank 9 located on either side of the pin 10. When the crank 9 is pivoted from one of the driving and rest positions to the other, the part 17 is inwardly moved against the action of the spring 18 until the crank has passed the vertical position, after which the action of the spring 18 urges the crank towards its new position.

The spring 18 also bears against a flange 21 of the friction member 20, which flange 21 both ensures the holding of the hub 7 in axial alignment and provides a frictional braking effect by bearing against the side plate 2 thereby preventing any unwanted rotation of the drum 6. A shoulder 23 on the hub 7 fitting in a corresponding recess in the drum 6 ensures that a counteracting frictional effect is exerted by a lateral surface 22 of the drum 6 on the inner surface of the side plate 1.

Figure 3:
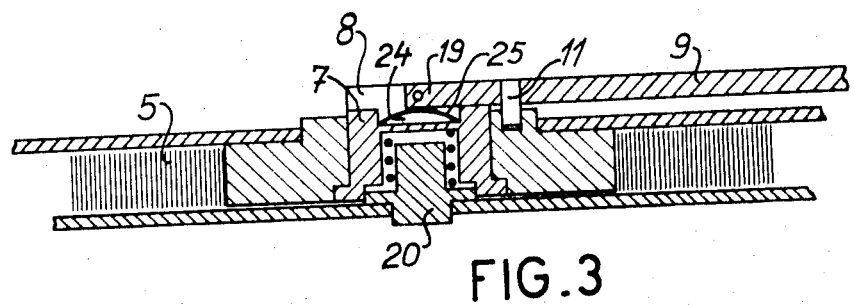
FIG. 3 is a cross-section similar to FIG. 2, for a modified instrument.

In the modified embodiment shown in FIG. 3, the member 17 is replaced by leaf spring 25 located in a housing 24 in the hub 7 under the end part 19 of crank 9. The other constructional features are the same except that the spring 18 urging the friction member 20 bears against the bottom of a blind bore in the hub 7.

Other modifications of the above-described embodiments can of course be made, such as in the dimensions and shape of the orifices 13, in the friction and braking means, and in the means for holding the crank in its two positions.

Figure 4:
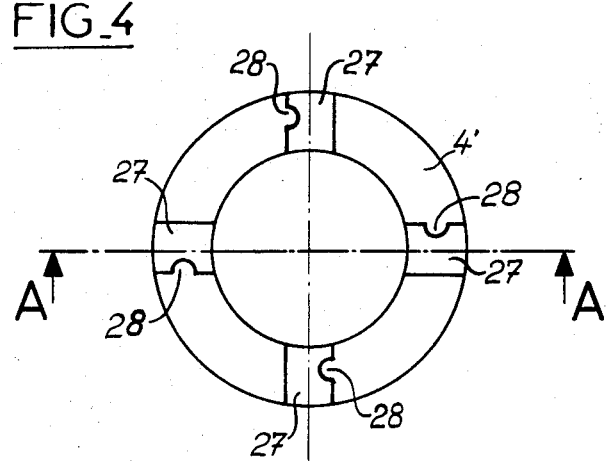
FIG. 4 is a schematic plan view of a modified coupling member.
Figure 5:
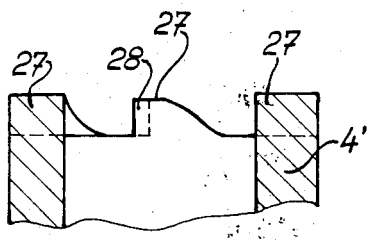
FIG. 5 is a cross-section taken along line A—A of FIG. 4.

For example, as indicated in FIGS. 4 and 5, a shoulder 4' (equivalent to the shoulder 4 of FIG. 2) instead of having orifices 13, is provided with a plurality of projections 27 having radial bearing faces 28 with a notch or recess for engaging the pin 11, and a sloping surface leading up to each face 28. The pin 11 thus only engages with the bearing faces 28 when the crank is in the winding position and is rotated in the clockwise direction, looking at FIG. 4. This disposition also has the advantage that the coupling means cannot easily be fouled with dust or the like, as could the orifices 13 of FIG. 1 in certain working conditions.

The linear measuring instrument shown in FIGS. 6 and 7 comprises two elongated side plates 31 and 32 with a grip or haft arranged at one end as for conventional large tape capacity instruments. A drum 35 rigidly fixed on an axial shaft 33 is freely rotatably mounted between plates 31 and 32, with an exterior shoulder portion 33a of the shaft bearing against the outer face of plate 31. A cylindrical element 36 is securely angularly fixed on the shoulder portion 33a, for example by means of mating non-circular sections. Element 36 has a spiral upper edge 37 the ends of which are joined by a stop 37a.

The shaft 33 has a screw threaded outer end with a flat 34, the drum 35 having a central opening with a corresponding flat and being firmly held against a shoulder at the end of the flat 34 by a tapped sleeve 33b screwed onto the shaft 33. The outer end of the sleeve 33b is freely mounted in an aperture in the plate 32.

The shaft 33 has, adjacent the shoulder portion 33a, an outer head 38 machined thereon, a circular piece 39 being fitted between this head 38 and a recessed upper face of the cylindrical element 36.

A crank 40 is pivotally mounted about a pin 41 passing transversally through the central part of a groove 39a of the piece 39, whereby the crank can be folded between two positions in which it lies parallel to the plates 31, 32 and is nested in the groove 39a.

The crank 40 carries a protruding block 42 which is spaced apart from the axis of the shaft 33 by the same radial distance as the edge 37 of the element 36. The height of the stop 37a and the dimensions of the crank 40 are such that when the crank is folded in a winding position (FIG. 6) and the crank is rotated in the clockwise winding direction (looking down at FIG. 7), the protruding block 42 comes into engagement with the stop 37a so that the drum 35 and tape 44 are also wound in the same direction. When the crank 40 is folded into a rest or disengaged position, the crank does not engage with the cylindrical element 36, so that the tape drum 35 is free to rotate independently of the crank 40.

A friction washer 43 is disposed between the cylindrical element 36 and the plate 31.

Of course, several stops such as 37a could be provided around the edge 37, which would enable the crank to be practically instantaneously brought into driving engagement with the drum.

The described coupling devices are simple and robust and the parts can be manufactured with relatively large tolerances, which can be reflected in the manufacturing cost.

What is claimed is:

1. A tape measure assembly comprising: two support plates and one having means therein defining an aperture; a tape drum rotatably mounted between said two support plates and including an annular lateral shoulder coaxial with the axis of said drum and protruding through said aperture; a crank member; means mounting said crank member for rotational movement coaxial with said tape drum and independent of said tape drum and for pivotable movement between a winding position and a non-winding position comprising a support member freely rotatably mounted within said annular lateral shoulder of said tape drum; and means for coupling said crank member to said tape drum to effect rotational movement of said tape drum in response to rotational movement of said crank member whenever said crank member is in said winding position, said means comprising a first coupling element fixedly mounted on said annular lateral shoulder of said tape drum and comprising at least one projection on said shoulder, each projection having a substantially radial face defining a stop, and a second coupling element mounted on said crank member engageable with said first coupling element whenever said crank member is in said winding position and disengageable from said first coupling element when said crank member is in said non-winding position and comprising a protuberance on said crank member bearing against said stop thereby engaging the two coupling elements when said crank is rotated in said winding position.

2. A tape measure assembly according to claim 1, in which each projection has an inclined surface leading up to the top of said stop face, said inclined surface disposed at least partially around a circle coaxial with the axis of the drum.

3. A tape measure assembly comprising: two support plates and one having means therein defining an aperture; a tape drum rotatably mounted between said two support plates and including an annular lateral shoulder coaxial with the axis of said drum and protruding through said aperture; a crank member; means mounting said crank member for rotational movement coaxial with said tape drum and independent of said tape drum and for pivotable movement between a winding position and a non-winding position comprising a support member freely rotatably mounted within said annular lateral shoulder of said tape drum and comprising a hub freely mounted in said drum; and means for coupling said crank member to said tape drum to effect rotational movement of said tape drum in response to rotational movement of said crank member whenever said crank member is in said winding position, said means comprising a first coupling element fixedly mounted on said annular lateral shoulder of said tape drum and a second coupling element mounted on said crank member engageable with said first coupling element whenever said crank member is in said winding position and disengageable from said first coupling element when said crank member is in said non-winding position.

4. A tape measure assembly according to claim 3, in which said first coupling element comprises means defining a plurality of orifices in said shoulder disposed around a circle coaxial with the axis of said drum, and wherein said second coupling element comprises a pin protruding from said crank member, said pin engaging in one of said orifices when said crank member is in said winding position.

5. A tape measure assembly according to claim 3, in which said hub comprises means for providing a frictional force between said hub and the other of said support plates.

6. A tape measure assembly according to claim 5, wherein said other support plate has means therein defining an aperture, and comprising means defining an axial bore in said hub, an axially movable element disposed in said axial bore and having a central shoulder freely rotatably mounted in said aperture in said other side plate and a flange bearing against the inner face of said other support plate, and a spring urging said element against said other support plate.

7. A tape measure assembly according to claim 6, wherein said hub has an annular flange thereon and said drum has means therein defining a groove and wherein said spring urges said drum towards said one support plate thereby engaging said annular flange on said hub with said corresponding groove in said drum.

8. A tape measure assembly according to claim 3, in which the hub includes spring means for urging the crank either into said non-winding position or into said winding position.

9. A tape measure assembly according to claim 8, wherein said hub has means therein defining a recess and in which said spring means comprises a leaf spring housed in said recess in said hub and bearing outwardly against an end portion of said crank member adjacent to said means mounting said crank for pivotable movement.

10. A tape measure assembly according to claim 8, wherein said hub has means therein defining a bore and in which said spring means comprises a spring housed in said bore in said hub and a member urged by said spring and bearing outwardly against an end portion of said crank member adjacent to said means mounting said crank member for pivotable movement.

11. A tape measure assembly comprising: two support plates; a shaft rotatably mounted between said two support plates and having a portion thereof protruding from one support plate; a cylindrical member secured on said protruding portion of said shaft; a tape drum mounted on said shaft between said support plates; a crank member; means mounting said crank member for rotational movement coaxial with said tape drum and independent of said tape drum and for pivotable movement between a winding position and a non-winding position including a support member freely rotatably mounted on said protruding portion of the shaft outside and adjacent to said cylindrical member; and means for coupling said crank member to said tape drum to effect rotational movement of said tape drum in response to rotational movement of said crank member whenever said crank member is in said winding position, said means comprising a first coupling element fixedly mounted on said cylindrical member and comprising an annular flange on said cylindrical member, said flange surrounding said support member and having at least one radial stop face defining a stop for said second coupling element and a second coupling element mounted on said crank member engageable with said first coupling element whenever said crank member is in said winding position and disengageable from said first coupling element when said crank member is in said non-winding position.

12. A tape measure assembly according to claim 11, in which said flange has a circular spiral surface and said radial face joins adjacent ends of said spiral surface, and wherein said second coupling element comprises a projection abutting against said stop face when said crank member is rotated while in said winding position.

13. A tape measure assembly according to claim 11, comprising a friction washer disposed between said one support plate and said cylindrical member.

* * * * *